United States Patent [19]

Coles

[11] Patent Number: 5,102,671
[45] Date of Patent: Apr. 7, 1992

[54] FEED PELLET MANUFACTURING PROCESS

[75] Inventor: Harold N. Coles, Glen Waverley, Australia

[73] Assignee: Sprout-Waldron Australia Pty. Limited, Dandenong, Australia

[21] Appl. No.: 684,481

[22] Filed: Apr. 12, 1991

Related U.S. Application Data

[63] Continuation of Ser. No. 431,893, Nov. 6, 1989, abandoned.

[51] Int. Cl.⁵ .......................... A23K 1/14; A23K 1/18; A23P 1/02; A23P 1/12
[52] U.S. Cl. ........................................ 426/1; 426/285; 426/454; 426/516
[58] Field of Search .................... 426/1, 285, 443, 453, 426/454, 512, 516, 517, 519, 560

[56] References Cited

U.S. PATENT DOCUMENTS

| | | | |
|---|---|---|---|
| 2,263,301 | 11/1941 | James | 426/560 |
| 3,343,963 | 9/1967 | Kjelson | 426/656 |
| 3,857,977 | 12/1974 | Huessy | 426/622 |
| 3,881,024 | 4/1975 | Pahoundis, Sr. et al. | 426/516 |
| 3,997,680 | 12/1976 | Chalin | 426/516 |
| 4,001,452 | 1/1977 | Williams | 426/516 |
| 4,132,807 | 1/1979 | Duke | 426/2 |
| 4,398,917 | 8/1983 | Reilly | 264/109 |
| 4,400,399 | 8/1983 | Müller | 426/1 |
| 4,464,404 | 8/1984 | Ueno et al. | 426/643 |
| 4,559,236 | 12/1985 | Okada | 426/643 |
| 4,584,024 | 4/1986 | Hisada et al. | 426/1 |
| 4,634,592 | 1/1987 | Faber et al. | 426/1 |
| 4,790,996 | 12/1988 | Roush et al. | 426/447 |
| 4,929,163 | 5/1990 | Volk | 426/454 X |
| 4,988,520 | 1/1991 | Overton | 426/454 X |
| 4,996,065 | 2/1991 | Van de Walle | 426/454 X |
| 5,009,908 | 4/1991 | Molaug et al. | 426/454 |

FOREIGN PATENT DOCUMENTS 719593  3/1980  U.S.S.R. .......................... 426/285

Primary Examiner—Arthur L. Corbin
Attorney, Agent, or Firm—James Creighton Wray

[57] ABSTRACT

A feed pellet which is stable in water is manufactured by mixing the materials, including wheat gluten, from which the pallet is to be made, without heating, extruding the pellets through a pellet mill before heating and subsequently cooking and effecting binding of the pellet by heating, preferably with steam.

8 Claims, No Drawings

FEED PELLET MANUFACTURING PROCESS

This application is a continuation of Ser. No. 431,893, filed Nov. 6, 1989, now abandoned.

BACKGROUND OF THE INVENTION

1. Field of the Invention

This invention relates to a method of manufacturing pellets and a pellet product.

2. Prior Art

Pellets, which are used as food stuffs for animals, have been made for many years using the conventional manufacturing process comprising the steps of mixing the components of the pellet, which may include meat or fish meal, soya meal, flour or other components and normally comprise twelve to fourteen percent of water, and then feeding these components into a conditioner where they are exposed to steam which effectively starts the cooking process and increases the moisture content so that the final product had approximately sixteen to eighteen percent of water, passing the material through a pelletizing mill, which caused further heating, and then cooling and drying the prepared pellets.

This process has provided a pellet which has been fully satisfactory for use as a pellet for animals and birds, where the pellets are normally maintained substantially dry but has not necessarily been satisfactory for providing pellets for all aquaculture type of applications.

Pellets for use in aquaculture need to maintain their integrity in the water for at least a number of hours and must also be able to withstand claw attack when they are being used, for example, for feeding prawns which pick the pellets up in their claws before passing them to their mouths.

Pellets produced by the conventional process have being unsatisfactory for such applications and it is believed that the main reason for this is that the pellets are normally bound by starch, which effects its binding by changing its state during the heating in the conditioner and whilst being formed into the pellets and when the pellets are wet the starch tends to expand and this tends to cause the pellets to disintegrate.

Some pellets have used artificial binders but such pellets are still unstable for use in aquaculture.

In the aquaculture art there have been substantial difficulties with food as if the food is not eaten, then it tends to decompose and pollutes the water in which the fish are located, and it is necessary to either clean tanks and flush water therethrough, if there is a build up of decomposing food or, when ocean fish are being cultured, it is necessary to ensure that the fish cages are located in a relatively active tidal area to ensure that the decomposed food is removed.

If pellets which have a good life in water can be fed to the fish, and in this specification fish is to include crustaceans and other marine animals, then not only will there be an economy in that there can be maximum usage of the food but also the level of pollution can be substantially reduced.

BRIEF DESCRIPTION OF THE INVENTION

It is an object of the present invention to provide a method of making pellets which are satisfactory for use in aquaculture.

The invention, in its broadest sense, comprises a method of making pellets including the steps of conditioning the raw material for the pellets cold, forming the pellets in a pellet mill and after formation heating the pellets to effect binding thereof.

The components of the pellets include wheat gluten and it may be preferred that the wheat gluten be present in the amount of between one and three percent.

It is also preferred that in the conditioning stage the moisture content of the raw materials can be increased to at least eighteen percent and possibly up to twenty-two or more, if the formulation permits.

These and further and other objects and features of the invention are apparent in the disclosure, which includes the above and ongoing written specification, including the claims.

DETAILED DESCRIPTION OF THE PREFERRED EMBODIMENT

In order that the invention may be more readily understood we shall describe, in relation to a particular example, the method of the invention.

The components of the pellets, which are normally high protein, may include sixty to seventy percent of, say, fish meal and soya meal and may have added thereto wheat gluten in the order of one to three percent and water in an amount to make the total percentage moisture up to twenty-two percent.

This mixing can be done in a conventional ribbon mixer and then introduced to the conditioner but with the difference from normal pelleting procedures in that the conditioner is run cold and some extra moisture can be added as water and not steam.

The conditioner also acts, as it does conventionally, to ensure a constant and consistant flow of raw material to the pellet mill.

The raw material is passed to the pellet mill where the pellets are formed and cut off in the conventional way.

After formation, instead of the pellets being cooled they are heated, with steam and or other heating medium, and whilst being heated they are either maintained separate or are agitated as the pellets will tend to aggregate when subjected to live steam which is not the case with conventionally formed pellets.

We have found a satisfactory treatment has been treatment with steam for two to five minutes.

The heating effects two functions.

In the first of these any starch present is converted as is conventional to a digestible form.

The second, and more importantly and surprisingly the wheat gluten changes form and acts as a binder which is substantially insoluble.

Although there is only a small percentage of gluten in the pellets it appears that the binding operation is effected throughout the pellets and we have found the pellets are strongly resistant to disolution in water and instead of being stable for only a few hours, which is the desideratum and which can not be reached by normally produced pellets, they are stable for many hours, and in some instances, for days.

We have produced pellets using only fish meal and soya meal but no flour, however the flour component was changed to include the equivalent percentage of wheat gluten and any other starch other than wheat starch i.e. rice, tapioca or corn, and have found in each case that the binding effect is achieved, so it is not due to the starch which may be used in wheat flour, but the wheat gluten.

We have produced pellets using glutens other than wheat gluten and have found that the resulting pellets are not successful.

It will be seen that the process of the present invention can readily be applied using equipment which is effectively standard with the exception of the necessity of providing an apparatus whereby the post forming heat treatment can be effected and this can either be a steam cabinet or box having an agitater whereby the individual pellets can be separated or alternatively it could include a conveyor through which steam passes and which moves at a sufficient rate to receive the pellets from the pellet mill so that they are effectively a single layer deep on the conveyor.

The particular form of this equipment is not in itself part of the invention.

While the invention has been described with reference to specific embodiments, modifications and variations of the invention may be constructed without departing from the scope of the invention, which is described in the following claims.

I claim:

1. A method of making edible feed pellets for use in aquaculture comprising conditioning, without heating, raw materials, including wheat gluten, from which the pellets are to be made, increasing the total water content of the raw materials without heating, forming the raw materials into pellets in a pellet mill before heating and thereafter heating the formed pellets to effect cooking and binding thereof.

2. A method as claimed in claim 1 wherein the conditioning without heating follows a mixing step in which the materials, without added water, are mixed.

3. A method as claimed in claim 1 wherein the formed pellets, while being heated, are agitated to prevent conglomeration.

4. A method as claimed in claim 1 wherein the heating is by steam.

5. A method as claimed in claim 1 wherein the formed pellets, while being heated, are maintained substantially separate to prevent conglomeration.

6. A method as claimed in claim 5 wherein the heating is by steam.

7. A method as claimed in claim 1 wherein the wheat gluten is present in an amount of at least 1% by weight.

8. A method as claimed in claim 1 wherein the wheat gluten is present in an amount of between 1 and 3% by weight.

* * * * *